(12) United States Patent
Christianson et al.

(10) Patent No.: US 7,502,207 B2
(45) Date of Patent: Mar. 10, 2009

(54) METHOD AND APPARATUS FOR PROTECTING MAGNETORESISTIVE HEADS FROM ELECTROSTATIC DISCHARGE

(75) Inventors: Jason A. Christianson, Apple Valley, MN (US); Michael John O'Brien, St. Paul, MN (US); Cameron Carroll Rabe, Inver Grove Heights, MN (US); Carl F. Elliott, Eden Prairie, MN (US)

(73) Assignee: Agere Systems Inc., Allentown, PA (US)

( * ) Notice: Subject to any disclaimer, the term of this patent is extended or adjusted under 35 U.S.C. 154(b) by 509 days.

(21) Appl. No.: 11/099,214

(22) Filed: Apr. 5, 2005

(65) Prior Publication Data

US 2006/0221489 A1 Oct. 5, 2006

(51) Int. Cl.
*G11B 5/127* (2006.01)
*G11B 5/55* (2006.01)

(52) U.S. Cl. ...................... 360/323; 360/110
(58) Field of Classification Search .................. 360/323
See application file for complete search history.

(56) References Cited

U.S. PATENT DOCUMENTS 5,212,602 A * 5/1993 Suzuki ........................ 360/66
5,681,025 A * 10/1997 Kuhn et al. ............. 251/129.12
6,400,534 B1 * 6/2002 Klaassen .................... 360/323
6,552,879 B2 4/2003 Voldman
7,119,995 B2 * 10/2006 Granstrom et al. .......... 360/323

OTHER PUBLICATIONS

Sedra et al., Microelectronic Circuits, 1998, Oxford University Press, Fourth Edition, p. 354.*
Sedra et al., Microelectronic Circuits, 1998, Oxford University Press, Fourth Edition, pp. 354 and 376-377.*

* cited by examiner

Primary Examiner—Jason Olson
(74) Attorney, Agent, or Firm—Priest & Goldstein, PLLC

(57) ABSTRACT

An apparatus and method for providing electrostatic discharge protection for a disc drive read head. A pair of depletion mode MOSFETS, and a fuse associated with each are disposed between the read head output terminals. The MOSFETS are controlled to an "off" state for testing the preamplifier prior to assembly of the read head. After assembly of the head, a second pair of MOSFETS is gated to an "on" state to open the fuses and thus permit normal operation of the read head.

31 Claims, 4 Drawing Sheets

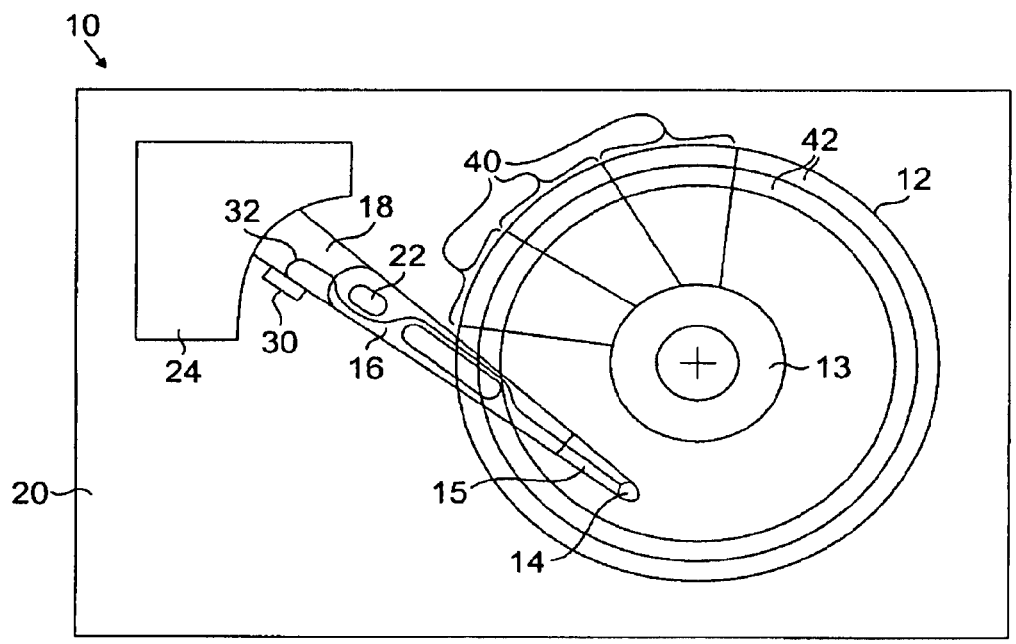
FIG. 1
(PRIOR ART)
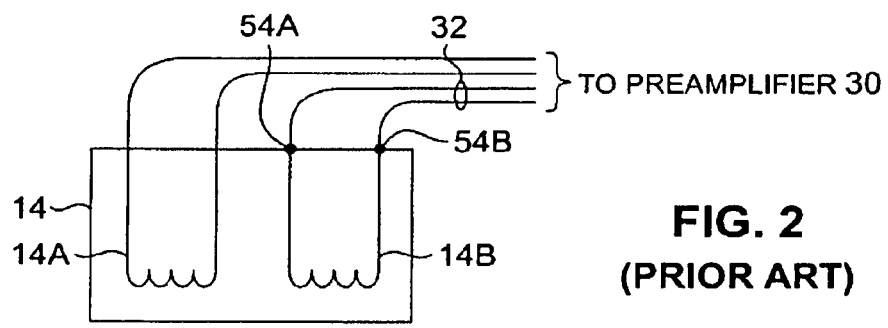
FIG. 2
(PRIOR ART)
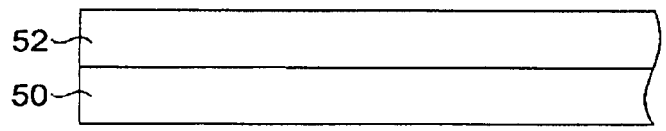

METHOD AND APPARATUS FOR PROTECTING MAGNETORESISTIVE HEADS FROM ELECTROSTATIC DISCHARGE

FIELD OF THE INVENTION

The present invention relates to an apparatus and a method for protecting a magnetic transducer from damage due to electrostatic discharge, and more particularly to an apparatus and a method employing fuses and switching devices for providing such electrostatic discharge protection.

BACKGROUND OF THE INVENTION

Disk drives are popular and cost effective data storage systems for a computer or other data processing device. As shown in FIG. 1, a disk drive 10 comprises a magnetic recording medium, in the form of a disk or platter 12 having a hub 13 and a magnetic read/write transducer 14, commonly referred to as a read/write head. The read/write head 14 is attached to, or formed integrally with, a suspension arm 15 suspended over the platter 12 and affixed to a rotary actuator arm 16. A structural arm 18 is fixed to a platform 20 and pivotably connected to the actuator arm 16 at a pivot joint 22. A voice coil motor 24 drives the actuator arm 16 to position the head 14 over a selected location on the disk 12 for reading data from or writing data to the disk 12.

As the disk 12 is rotated by a spindle motor (not shown) at an operating speed, air flow generated by the rotating disk, in conjunction with the physical features of the suspension arm 15, produces lift for displacing the read/write head 14 above the platter 12, allowing the head to glide on a cushion of air slightly above an upper surface of the platter 12. The flying height of the read/write head over the disk surface is typically less than a micron. A preamplifier 30, electrically connected to the head 14 by flexible conductive leads 32, amplifies signals generated in the head 14 during a read operation to improve a signal-to-noise ratio of a read signal. In addition to the preamplifier 30, an arm electronics module (not shown in FIG. 1 but mounted proximate the preamplifier) may include circuits that switch the head function between read and write operations and write drivers that supply a write current to the head 14 during the write operation to store data on the platter 12. In one embodiment, the preamplifier is one element of the electronics module. The configuration and components of the arm electronics module and the preamplifier 30 may vary according to the system design as understood by persons familiar with such technology.

Data bits supplied to the disk drive 10 are stored on the platter 12 in sectors 40 of concentric tracks 42. Typically, a sector contains a fixed number of bytes (for example, 256 or 512). A plurality of sectors are commonly grouped into a cluster.

FIG. 2 illustrates the platter 12 comprising a substrate 50 and a thin film 52 disposed thereover. The magnetic transducer or head 14 comprises a write head 14A for writing data bits to the disk 12 by altering magnetic domains of ferromagnetic material in the film 52, thereby creating magnetic transitions in the magnetic domains. A read head 14B reads the magnetic transitions to determine the stored data bit.

In other embodiments, the write head 14A and the read head 14B operate with other storage media (not shown) comprising a rigid magnetic disk, a flexible magnetic disk, magnetic tape and a magneto-optical disk.

The read head 14B is biased by a DC (direct current) voltage of about 0.3V supplied by the preamplifier 30 to read head terminals 54A and 54B via the conductive leads 32. The magnetic domains in the thin film 52 passing under the read head 14B alter a resistance of the magneto-resistive material, imposing an AC (alternating current) component in the DC bias voltage, wherein the AC component represents the read data bits. The AC component is supplied to the preamplifier 30 via the conductive leads 32. The AC component of the head output signal is relatively small (e.g., several millivolts) with respect to the DC bias voltage.

The susceptibility of certain integrated circuits to electrostatic discharge events is well known. An ESD event occurs when a charged object (e.g., a finger of a person handling the integrated circuit or a device for capturing and installing the integrated circuit into a printed circuit board) is disposed proximate an integrated circuit pin having a different potential than the charged object. If the potential difference is sufficient to breakdown insulating material separating the charged object and the pin (e.g., air) an electrostatic discharge is produced. Such discharges may generate a current exceeding one ampere during a period of less than 200 nanoseconds. The discharge current magnitude and waveform depend on the effective resistance, capacitance and inductance in the discharge path and the charge intensity present on the surfaces before the static discharge. The ESD event can destroy the integrated circuit by damaging substrate material or conductive interconnects in the integrated circuit. It is common practice to include ESD-protection components within the integrated circuit for directing the ESD current away from static-discharge sensitive components.

The disk drive read head 14B typically comprises either a magneto-resistive (MR) sensor or an inductive sensor. The MR sensor is more commonly used, especially in high-density disk drives, because the MR sensor generates a larger amplitude output signal than the inductive sensor, resulting in a higher signal-to-noise ratio in the read mode and a higher areal data storage density for the disk drive 10. However, when exposed to an ESD event or an electrical overstress (EOS) condition (i.e., an input voltage or current greater than expected under normal operating conditions), the MR sensor tends to be more susceptible to damage than its inductive counterpart due to the relatively small physical size of the MR sensing material. For example, a typical cross-section for an MR read sensor used for extremely high recording densities is about 100 Angstroms by 1.0 micrometer. An ESD event producing a discharge voltage of only a few hundred millivolts across such a small resistance is sufficient to produce currents capable of severely damaging or destroying the MR read head.

The read head 14B typically operates as a differential device, i.e., during a read operation the differential voltage across the signal terminals 54A and 54B represents the read data bits, with a voltage of a first polarity indicating a stored first logic level and a voltage of a second polarity indicating a stored second logic level. The read head 14B is thus extremely sensitive to ESD damage caused by a high differential voltage applied between the signal terminals 54A and 54B. A differential voltage as low as 0.5 volts can damage a state-of-the-art MR head due when ESD current flows through the head. A single relatively low magnitude ESD event or a series of relatively low magnitude events can degrade the magneto-resistive element, changing the resistance of the MR head and thus the head response during read operations, possibly causing data read errors. A relatively large ESD event can melt or evaporate the magneto-resistive element.

Given their high-ESD sensitivity, to prevent ESD/EOS damage, the MR sensor must be carefully handled during manufacture/assembly of the disk drive 10 and the read head 14B. Such ESD events are especially likely during manufacturing stages when the terminals 54A and 54B are exposed.

For example, in a manufacturing process employing a rubber or plastic conveyor belt for transporting the head and associated components between manufacturing stations, ionized gas is dispersed over the conveyor belt to discharge electrostatic charges generated in the belt material.

During the disk drive assembly process the preamplifier 30 is connected to the head terminals 54A and 54B via the conductors 32A and 32B. To provide additional ESD protection for the read head 14B, it is advantageous for the preamplifier 30 to include one or more components to direct the ESD charge away from the MR read head 14B during the remainder of the assembly process. Since no power is supplied to the preamplifier 30 during the assembly operation, such components operate passively, i.e. they do not require the application of an external voltage. However, it is known that during disk drive operation parasitic capacitances produced by these passive components tend to degrade the read signal quality. This signal degradation becomes an increasingly troublesome problem as read data rates increase, it is therefore desired to employ ESD protection components that protect the read head 14B during assembly, without degrading preamplifier/head performance during operation.

One prior art technique for providing ESD protection for the differential signal terminals 54A and 54B (connected respectively to conductive leads 32A and 32B of the flexible conductive leads 32) is illustrated in FIG. 3. Diodes 70 and 72 are connected back-to-back (i.e., a cathode of a first diode is connected to anode of a second diode and an anode of the first diode is connected to a cathode of the second diode; also referred to as an anti-parallel configuration) to short or clamp the signal terminals 54A and 54B together in response to application of either a negative or a positive ESD voltage to either the terminal 54A or 54B. The diodes 70 and 72 provide adequate protection if the read head 14B can withstand a differential voltage greater than a diode turn-on voltage of about 0.8V, i.e., the voltage at which the diode becomes conductive and shorts the differential signal terminals 54A and 54B. Unfortunately, newer generation heads can fail at differential voltages below 0.8V. Although it may be possible to identify diodes fabricated from material providing a turn-on voltage below 0.8V, disadvantageously such a low turn-on voltage clips the differential head output signal if the diodes are driven into conduction during a read operation.

Another prior art technique as disclosed in U.S. Pat. No. 6,552,879 is illustrated in FIG. 4. A MOSFET (metal oxide semiconductor field effect transistor) 80, connected between the terminals 54A and 54B, is triggered to a conductive state, i.e., a low resistance path between a drain D and a source S, by a static charge sensing circuit 56 that triggers a gate G in response to the ESD voltage. The low resistance source-drain path effectively shorts the terminals 54A and 54B, preventing a voltage differential from developing therebetween.

The sensing circuit 56 adds cost and a space penalty to the disk drive 10 and requires a power source for operation. During disk drive assembly, power is not applied to the sensing circuit 56 and thus the circuit cannot provide ESD protection. To overcome the lack of a power source, in another embodiment the sensing circuit 56 is powered by the applied static pulse. But this embodiment requires a pulse amplitude larger than about 0.5V, in contravention of the requirement that the discharge protection circuit maintain the differential input voltage at less than about 0.5V.

Yet another prior art technique, illustrated in FIG. 5, comprises a fuse 84 connected across the terminals 54A and 54B. During disk drive assembly the fuse 84 shorts ESD current between the terminals 54A and 54B. After the head 14B is assembled by the disc drive manufacturer the fuse is opened. However, with the fuse short circuit precludes testing of the read head 14B when the head is in the form of an integrated circuit on a semiconductor wafer. Also, the fuse 84 does not provide a ground path for common mode charges induced across the terminals 54A and 54B.

According to another prior art technique, a depletion mode MOSFET 88 (see FIG. 6) is connected between the terminals 54A and 54B. It is known that a channel of the MOSFET 88 must be relatively large to minimize its "on" resistance and thereby reduce the ESD voltage (i.e., bleed the ESD charge) that is developed across the terminals 54A and 54B during an ESD event. If the "on" resistance is excessive then the voltage developed across the resistance can damage the read head 14B. However, as the MOSFET channel size increases, the parasitic capacitance introduced into the signal path between the read head 14B and the preamplifier 30 also increases. The parasitic capacitance reduces the operating bandwidth, a potential problem as disc drive heads are required to operate at higher data rates when reading data from the disk 12.

SUMMARY OF THE INVENTION

In one embodiment, the present invention comprises an apparatus providing protection against excess current flow into a transducer having first and second output terminals, the apparatus. The apparatus comprises a first serial branch comprising a first fuse and a first switching element for connection between the first output terminal and a common node, wherein the first switching element presents a normally-closed state; a second serial branch comprising a second fuse and a second switching element for connection between the second output terminal and the common node, wherein the second switching element presents a normally-closed state; a third switching element operable to open the first fuse; and a fourth switching element operable to open the second fuse.

The present invention further comprises a method for operating a device comprising first and second differential output terminals. The method comprises maintaining a low resistance path between the first and the second differential output terminals during a during a first device operating condition, wherein the path comprises at least one fuse, and changing the resistance of the path to a higher resistance by opening the at least one fuse during a second device operating condition wherein the path comprises at depletion mode MOSFET in series with the fuse, the method further comprising controlling the depletion mode MOSFET to an open condition.

BRIEF DESCRIPTION OF THE DRAWINGS

The present invention can be more easily understood and the advantages and uses thereof more readily apparent when the following detailed description of the present invention is read in conjunction with the figures wherein:

FIG. 1 illustrates a prior art disk drive to which the teachings of the present invention can be applied.

FIG. 2 is a schematic diagram of a head of the disk drive of FIG. 1.

In accordance with common practice, the various described device features are not drawn to scale, but are drawn to emphasize specific features relevant to the invention. Reference characters denote like elements throughout the figures and text.

DETAILED DESCRIPTION OF THE INVENTION

Before describing in detail the particular method and apparatus related to protecting magnetoresistive heads and other forms of sensors and transducers from electrostatic discharge according to the present invention, it should be observed that the present invention resides primarily in a novel and nonobvious combination of elements and process steps. So as not to obscure the disclosure with details that will be readily apparent to those skilled in the art, certain conventional elements and steps have been presented with lesser detail, while the drawings and the specification describe in greater detail other elements and steps pertinent to understanding the invention.

Figure 3:
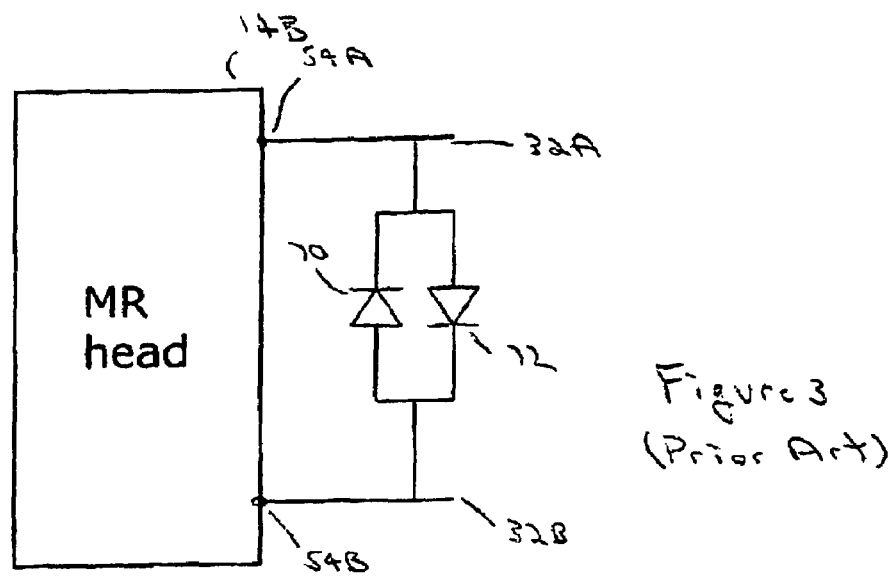
FIGS. 3-6 are schematic representations of prior art techniques for protecting the head of FIG. 2 from electrostatic discharge damage.
Figure 4:
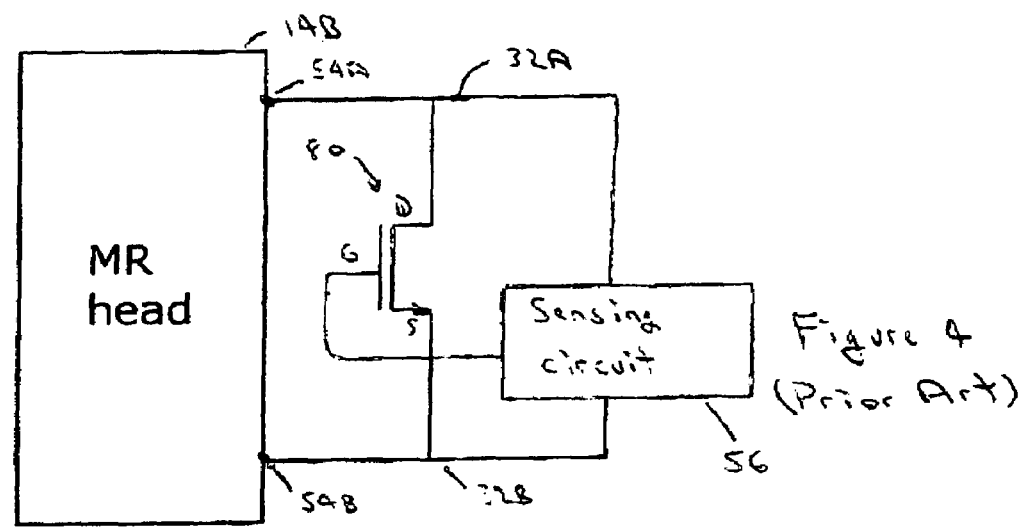
Figure 5:
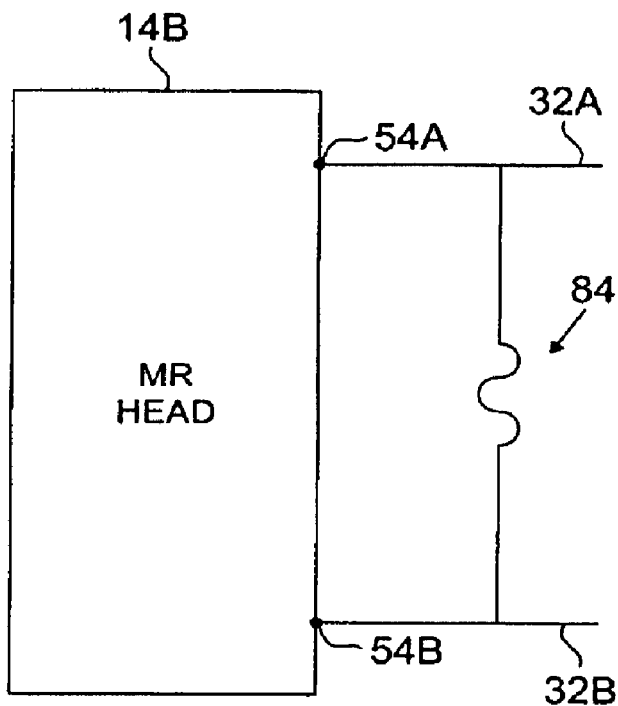
Figure 6:
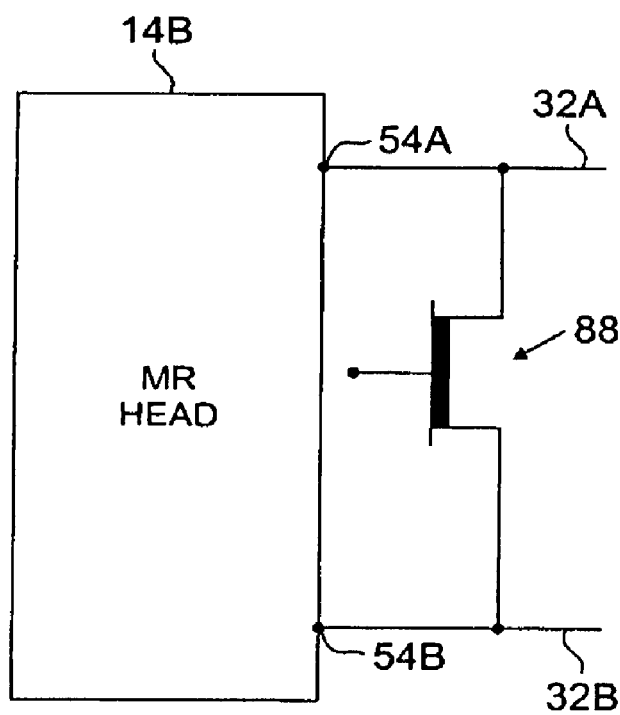
Figure 7:
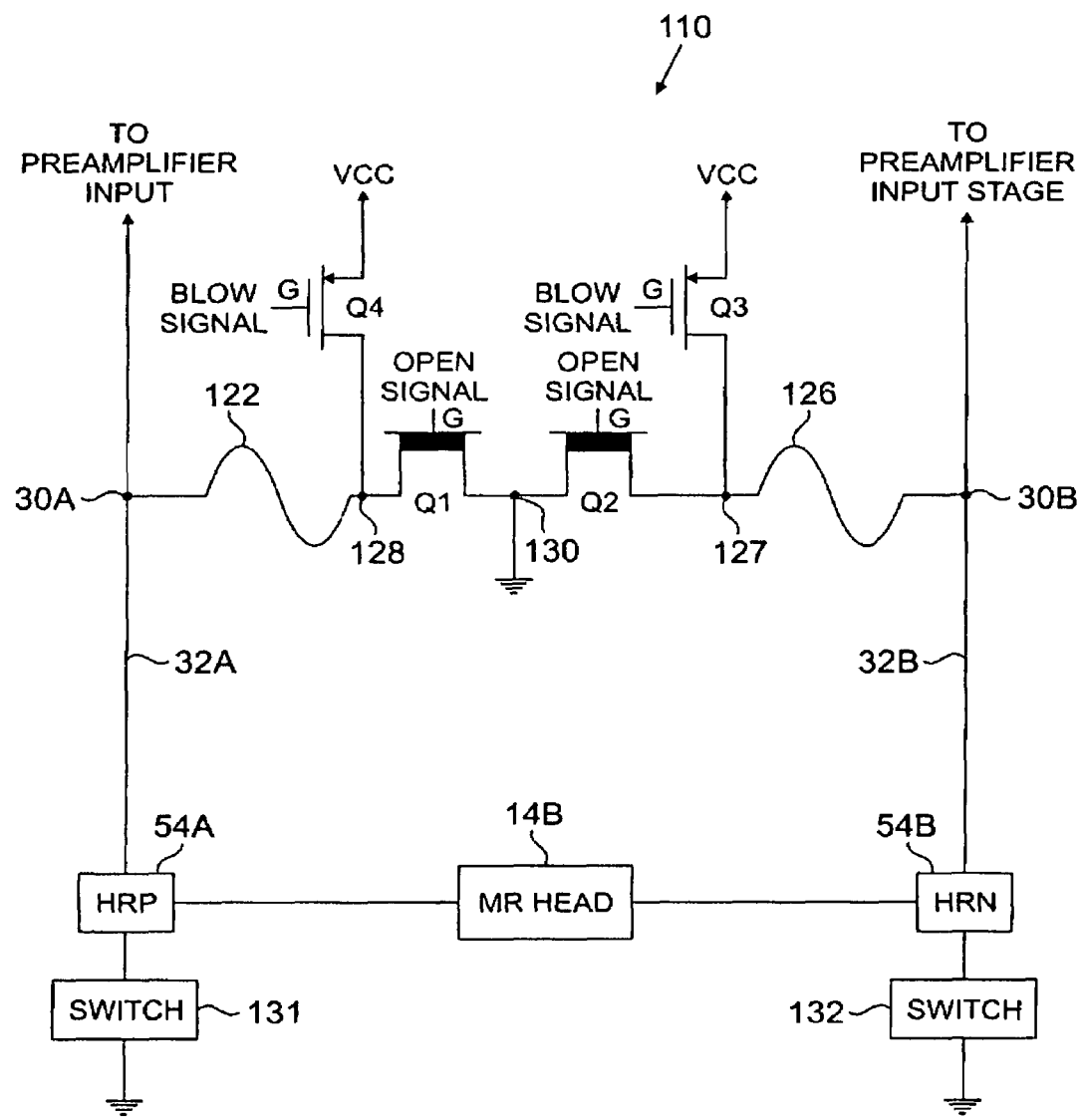
FIG. 7 is a schematic representation of a technique for protecting the head of FIG. 2 from electrostatic discharge damage according to the teachings of the present invention.

An electrostatic discharge protection apparatus 110 (see FIG. 7) constructed according to the teachings of the present invention provides ESD protection for the head 14B of the disk drive 10 of FIG. 1. Preferably, the ESD protection apparatus 110 is disposed within the preamplifier 30 for protecting the read head 14B after joining the read head 14B and the preamplifier 30 during disk drive assembly.

The ESD protection apparatus 110 comprises a serial arrangement of a fuse 122 (i.e., a device controllable to an open state), depletion mode MOSFETS Q1 and Q2 and a fuse 126 (i.e., a device controllable to an open state) disposed between preamplifier input terminals 30A and 30B that are connected to the head terminals 54A and 54B via the conductors 32A and 32B. A common terminal 130 between a source/drain of the MOSFET Q1 and a source/drain of the MOSFET Q2 is connected to ground. MOSFETS Q3 and Q4 are connected between a power supply Vcc (or alternatively a current source) and nodes 127 and 128, respectively. Those skilled in the art recognize that other switching elements controllable to an open and a closed state can be substituted for the MOSFETS Q1 and Q2.

Switches (preferably implemented as a semiconductor device but those skilled in the art recognize that elements controllable to an open and a closed state can be employed) 131 and 132 controllably connect the head terminals 54A and 54B to ground as described below.

The depletion mode MOSFETS Q1 and Q2 are in an "on" state in the absence of a gate bias signal. Thus when the preamplifier 30 is without power, for example during assembly of the disk drive 10, a channel region of the MOSFETS Q1 and Q2 is conductive. In this condition the head terminals 54A and 54B and the preamplifier terminals 30.11 and 30B axe shorted to ground. If an ESD event occurs by contact of either or both of the head terminals 54A and 54B and/or the preamplifier terminals 30A and 30B with a charged object, the ESD current flows through the fuses 122 and/or 126 and the depletion mode MOSFETS Q1 and/or Q2 to ground via the terminal 130. No current flows through the read head 14B and head damage is thereby prevented.

It is frequently desired to test the preamplifier prior to assembly of the disk drive, to determine whether the preamplifier 30 is operating properly. To conduct such a test according to the present invention, a control signal is applied to a gate terminal G of each of the MOSFETS Q1 and Q2 to open or turn the MOSFET "off." In this state, the preamplifiers terminals 30A and 30B are disconnected from the ground terminal 130, permitting preamplifier testing. This configuration could also be utilized to test joint operation of the preamplifier 30 and the read head 14B prior to completion of the assembly process.

After assembly of the head 14 into the disk drive system, the fuses 122 and 126 are opened by operation of the MOSFETS Q3 and Q4, which are appropriately sized to carry the necessary current to blow the fuses. The terminals 54A and 54B are grounded by closure of the switches 131 and 132. The MOSFETS Q1 and Q2 are placed in an open or "off" state by application of an appropriate control signal to each gate G thereof and a blow fuse control signal is applied to a gate G of each MOSFET Q3 and Q4. Current flows through each MOSFET Q3 and Q4 from the voltage supply Vcc through the respective fuses 122 and 126 to ground through the switches 131/132. The current is adapted to be sufficiently large to open the fuses 122 and 126. Those skilled in the art recognize that the current magnitude required to open the fuses 122 and 126 depends on the specific fuse design and the fabrication process utilized to fabricate the fuse. Once the fuses 122 and 126 are opened and the switches 131 and 132 returned to an open or "off" condition, the read head 14B and the preamplifier 30 are in a functional state.

The prior art parasitic capacitance between the preamplifier terminals 30A and 30B is absent since the depletion mode MOSFET Q1 and Q2 are not connected to the preamplifier terminals 30A and 30B once the fuses 122 and 126 are opened. Thus the MOSFETS Q1 and Q2 can be appropriately sized to provide optimum head protection during assembly, without concern for the introduction of parasitic capacitances during operation of the preamplifier 30 and the read head 14B.

In another embodiment of the ESD protection apparatus, the ground terminal 130 is absent and thus the embodiment protects against only differential ESD events. However, such an embodiment does not protect against common mode or single ended (i.e., involving only one of the head terminals 54A and 54B) ESD events, as the ESD current path to ground is absent.

Although the ESD protection apparatus of the present invention has been described as disposed within the preamplifier 30 of the disk drive 10 this is not a requirement of the present invention. According to other embodiments, the ESD protection apparatus can be disposed in other elements associated with the disk drive 10.

Those skilled in the art recognize that conventional preamplifiers 30 typically include ESD protection elements. Given the capability of the present invention to provide ESD protection for both the preamplifier 30 and the read head 14B, it may be possible to reduce or eliminate these preamplifier elements. Further, since such elements typically have a negative effect on the preamplifier's operating bandwidth, their elimination should increase that bandwidth.

While the present invention has been described with reference to preferred embodiments, it will be understood by those skilled in the art that various changes may be made and equivalent elements may be substituted for the elements thereof without departing from the scope of the invention. The scope of the present invention further includes any combination of elements from the various embodiments set forth herein. In addition, modifications may be made to adapt a particular situation to the teachings of the present invention without departing from its essential scope. Therefore, it is intended that the invention not be limited to the particular embodiments disclosed, but that the invention will include all embodiments falling within the scope of the appended claims.

What is claimed is:

1. An apparatus for protecting a transducer from damage during an electrostatic discharge event, the transducer having first and second output terminals, the apparatus comprising:
 a first serial branch comprising a first fuse and a first switching element for connection between the first output terminal and a common node, wherein the first switching element presents a normally-closed state;
 a second serial branch comprising a second fuse and a second switching element for connection between the second output terminal and the common node, wherein the second switching element presents a normally-closed state;
 a third switching element operable to open the first fuse; and
 a fourth switching element operable to open the second fuse.

2. The apparatus of claim 1 wherein one or more of the first and the second switching elements are selected from the group comprising a depletion mode NMOSFET, a depletion mode PMOSFET and a depletion mode JFET.

3. The apparatus of claim 1 wherein the third and the fourth switching elements are responsive to a control signal for causing current to flow therethrough for opening the first and the second fuses.

4. The apparatus of claim 1 wherein the third switching element comprises a first MOSFET and the fourth switching element comprises a second MOSFET, and wherein the first MOSFET comprises a first source/drain connected between the first fuse and the first switching element and a second source/drain responsive to a source of current, and wherein the second MOSFET comprises a third source/drain connected between the second fuse and the second switching element and a fourth source/drain connected to a source of current, and wherein a control signal supplied to a gate of each of the first and the second MOSFETS causes current to flow through a channel thereof to the first and the second fuse, respectively, to open the first and the second fuse.

5. The apparatus of claim 1 wherein the first output terminal is switchably connected to ground through a ground switch, the apparatus further comprising a control signal for closing the third switching element to provide current from a supply through the third switching element, the first fuse, the first output terminal and to ground through the ground switch, and wherein the current opens the first fuse.

6. The apparatus of claim 1 wherein the second output terminal is switchably connected to ground through a ground switch, the apparatus further comprising a control signal for closing the fourth switching element to provide current from a supply through the fourth switching element, the second fuse, the second output terminal and to ground through the ground switch, and wherein the current opens the second fuse.

7. The apparatus of claim 1 wherein the transducer comprises a magnetoresistive head for use with a disk drive data storage system, and wherein the first and the second output terminals comprise first and second differential output terminals.

8. The apparatus of claim 1 further comprising a preamplifier connected to the first and the second output terminals, wherein the first and the second serial branches and the third and the fourth switching elements are disposed within the preamplifier.

9. The apparatus of claim 8 wherein during a preamplifier test the first and the second switching elements are controlled to an open condition.

10. The apparatus of claim 1 wherein the common node is connected to ground.

11. The apparatus of claim 1 wherein during an electrostatic discharge (ESD) or an electrical overstress (EOS) event a discharge current flows through the first serial branch to ground, through the second serial branch to ground or through the first and the second serial branches.

12. The apparatus of claim 1 wherein during an operating condition of the apparatus the first and the second switching elements are controlled to an open condition.

13. The apparatus of claim 1 wherein the first and the second switching elements each comprise a normally-closed switching element and the third and the fourth switching elements each comprises a normally-open switching element.

14. An apparatus providing protection against current flow into a transducer during a first non-operating condition of the transducer, the transducer comprising a first and a second output terminal, the apparatus comprising:
 a first serial branch disposed between the first output terminal and ground, the first serial branch comprising a first fuse and a source/drain path of a first depletion mode transistor;
 a second serial branch disposed between the second output terminal and ground, the second serial branch comprising a second fuse and a source/drain path of a second depletion mode transistor;
 a first normally-open transistor having a first source/drain terminal connected between the first fuse and the first depletion mode transistor;
 a second normally-open transistor having a first source/drain terminal connected between the second fuse and the second depletion mode transistor;
 a control signal for placing the transducer in an operating condition, wherein the control signal closes the first and the second normally-open transistors permitting current flow from a power supply connected to a second source/drain terminal of the first and the second normally-open transistors through the first and the second depletion mode transistors and through the first and the second fuses to ground for opening the first and the second fuses; and
 wherein during the first non-operating condition the first and the second output terminals are shorted by the first and the second serial branches.

15. The apparatus of claim 14 wherein during an electrostatic discharge (ESD) or an electrical overstress (EOS) event occurring during the non-operating condition a discharge current flows through the first and the second serial branches.

16. The apparatus of claim 14 wherein the first and the second depletion mode transistors are controllable to an open condition during a second non-operating condition of the transducer.

17. The apparatus of claim 14 wherein the first, the second, the third and the fourth transistors each comprise a MOSFET.

18. An apparatus comprising: a transducer having first and second differential output terminals;
 a first serial branch comprising a first fuse and a source/drain path of a first depletion mode transistor disposed between the first differential output terminal and a common node;
 a second serial branch comprising a second fuse and a source/drain path of a second depletion mode transistor disposed between the second differential output terminal and the common node;
 a first switching element having a first terminal connected between the first fuse and the first depletion mode transistor;

a second switching element having a first terminal connected between the second fuse and the second depletion mode transistor; and the first and the second switching elements responsive to a control signal for causing current to flow through the first and the second switching elements for opening the first and the second fuses.

19. The apparatus of claim 18 wherein the common node comprises a ground connection.

20. The apparatus of claim 18 wherein the first and the second switching elements comprise a first and a second MOSFET, and wherein the first terminal of each of the first and the second MOSFETS comprises a source/drain terminal, each of the first and the second MOSFETS further comprising a second source/drain terminal for connection to a source of power and a gate terminal responsive to the control signal.

21. An apparatus for protecting a transducer from damage during an electrostatic discharge event, the transducer having first and second output terminals, the apparatus comprising:

a first shorting branch connected between the first output terminal and a ground node;

a second shorting branch connected between the second output terminal and a ground node;

the first and the second shorting branches comprising a first and a second switch element, respectively, each controllable to an open state in response to a first control signal for opening the first and the second shorting branches;

a third and a fourth switch element responsive to a power source and connected to the first and the second shorting branches respectively and each responsive to a second control signal for opening the first and the second shorting branches in response to current through the first and the second shorting branches as supplied by the power source.

22. A disk drive storage apparatus comprising: a transducer having a first and a second differential output terminal:

a first fuse and a source/drain path of a first depletion mode transistor disposed between the first differential output terminal and a common node;

a second serial branch comprising a second fuse and a source/drain path of a second depletion mode transistor disposed between the second differential output terminal and a common node;

a first switching element having a first terminal connected to a common connection of the first fuse and the first depletion mode transistor;

a second switching element having a first terminal connected to a common connection of the second fuse and the second depletion mode transistor; and a control signal for closing the first and the second switching elements to permit current flow through the first and the second fuses for opening the first and the second fuses.

23. The apparatus of claim 22 wherein the common node comprises a ground connection.

24. The apparatus of claim 22 wherein the first and the second switching elements comprise first and second normally-off MOSFETS, and wherein the first and the second depletion mode transistors comprise first and second depletion mode MOSFETS.

25. A method for operating a device comprising first and second differential terminals, the method comprising:

maintaining a first path with low resistance between the first differential terminal and ground and a second path with low resistance between the second differential terminal and ground during a first operating condition of the device, wherein the first path comprises a first fuse and the second path comprises a second fuse; and changing the resistance of the first and second paths to a higher resistance by opening the first and second fuses during a second operating condition of the device, wherein the first path comprises a first depletion mode MOSFET in series with the first fuse the second path comprises a second depletion mode MOSFET in series with the second fuse, the method further comprising controlling both of the first and second depletion mode MOSFETs to a closed condition during the first operating condition and to an open condition during the second operating condition.

26. The method of claim 25 wherein the step of changing the resistance further comprises supplying a voltage to a gate terminal of a third MOSFET associated with the first path and to a gate terminal of a fourth MOSFET associated with the second path to cause current to flow through both of the fuse to open the fuses.

27. The method of claim 25 wherein the first operating condition provides electrostatic discharge (ESD) protection to the device.

28. The method of claim 25 wherein the first operating condition exists when the first or second differential terminals are not connected in a circuit.

29. The method of claim 25 wherein the second operating condition is for functionally operating the device.

30. The method of claim 27 further comprising:

changing the resistance of the first and second paths to a higher resistance by controlling both of the first and second depletion mode MOSFETs to an open condition during a third operating condition of the device.

31. The method of claim 30 wherein the third operating condition of the device is for testing the device.

* * * * *